(12) United States Patent
Dai et al.

(10) Patent No.: US 7,488,508 B2
(45) Date of Patent: Feb. 10, 2009

(54) ASYMMETRIC END-FUNCTIONALIZATION OF CARBON NANOTUBES

(75) Inventors: Liming Dai, Beavercreek, OH (US); Kyung Min Lee, Cuyahoga Falls, OH (US)

(73) Assignee: University of Dayton, Dayton, OH (US)

( * ) Notice: Subject to any disclaimer, the term of this patent is extended or adjusted under 35 U.S.C. 154(b) by 393 days.

(21) Appl. No.: 11/355,570

(22) Filed: Feb. 16, 2006

(65) Prior Publication Data

US 2006/0257556 A1 Nov. 16, 2006

Related U.S. Application Data

(60) Provisional application No. 60/653,382, filed on Feb. 16, 2005.

(51) Int. Cl.
*B05D 5/12* (2006.01)
(52) U.S. Cl. .................................. 427/122; 427/558
(58) Field of Classification Search .............. 427/558, 427/122
See application file for complete search history.

(56) References Cited

U.S. PATENT DOCUMENTS

| 2005/0074390 A1 | 4/2005 | Tour et al. | |
| 2005/0191427 A1 * | 9/2005 | Wade et al. | 427/402 |

FOREIGN PATENT DOCUMENTS

| GB | 2 412 370 A | 9/2005 |
| WO | WO 02/060812 A2 | 8/2002 |
| WO | WO 2005/113434 A1 | 12/2005 |

OTHER PUBLICATIONS

Holzinger, Michael et al. "Sidewall Functionalization of Carbon Nanotubes", 2001, Angew. Chem. Int. Ed., Wiley-VCH, 4002-4005.*

Moghaddam, Minoo J et al. "Highly Efficient Binding of DNA on the Sidewalls and Tips of Carbon Nanotubes Using Photochemistry", Dec. 9, 2003, American Chemical Society, Nano Letters vol. 4, No. 1, 89-93.*

Lewenstein, Justin C et al. "High-Yield Selective Placement of Carbon Nanotubes on Pre-Patterned Electrodes", Apr. 17, 2002, American Chemical Society, Nano Letters vol. 2, No. 5, 443-446.*

Chen et al, "Solution Properties of Single-Walled Carbon Nanotubes" Science, vol. 282, Oct. 2, 1998, pp. 95-98.

Kyung Min Lee, Lingchuan Li, and Liming Dai, Asymmetric End-Functionalization of Multi-Walled Carbon Nanotubes, Web, Mar. 5, 2005, pp. 4122-4123, vol. 127, No. 12, USA.

(Continued)

*Primary Examiner*—Timothy H Meeks
*Assistant Examiner*—Nathan Leong
(74) *Attorney, Agent, or Firm*—Dinsmore & Shohl LLP

(57) ABSTRACT

A method of making an asymmetric end-functionalized carbon nanotube film is described. The method includes providing a carbon nanotube film having a first end and a second end; contacting the first end of the carbon nanotube film with a first reactive medium; reacting the first end of the carbon nanotube film with the first reactive medium by a first physicochemical process; contacting the second end of the carbon nanotube film with a second reactive medium, wherein the first reactive medium is different from the second reactive medium; and reacting the second end of the carbon nanotube film with the second reactive medium by a second physicochemical process.

21 Claims, 3 Drawing Sheets

OTHER PUBLICATIONS

Marko Burghard, Asymmetric End-Functionalization of Carbon Nanotubes, Wiley-VHC Verlag GmbH & Co., Sep. 20, 2005, pp. 1148-1150, small 2005, 1, No. 12, Weinheim, Germany.

Nitin Chopra, Mainak Majumder, Bruce J. Hinds, Bifunctional Carbon Nanotubees by Sidewall Protection, Wiley-VHC Verlag GmbH & Co., Nov. 5, 2004, Adv. Funct. Mater. 2004, 15, No. 5, May, Weinheim, Germany.

* cited by examiner

ASYMMETRIC END-FUNCTIONALIZATION OF CARBON NANOTUBES

CROSS REFERENCE TO RELATED APPLICATIONS

This application claims the benefit of U.S. Provisional Application No. 60/653,382 filed Feb. 16, 2005.

BACKGROUND OF INVENTION

The use of carbon nanotubes for many practical applications often requires a precision landing of individual nanotubes into various functional structures and devices. In this regard, the synthesis of aligned and/or micropatterned carbon nanotubes has played a critical role in facilitating the integration of carbon nanotubes into certain useful devices (e.g. electron-emitters, transistors etc.). However, a more general self-assembling approach would allow the construction of individual nanotubes into various functional structures with a molecular precision. For this purpose, the site-selective chemical modification of carbon nanotubes is essential. Recently, judicious application of site-selective reactions to non-aligned and aligned carbon nanotubes for selectively modifying nanotube tips, inner and/or outer walls has opened a rich field of carbon nanotube chemistry. It has been demonstrated that the sidewalls of carbon nanotubes are rather unreactive due to the seamless arrangement of hexagon rings without any dangling bonds, and that the fullerene-like tips of carbon nanotubes are more reactive than the sidewalls for chemical attaching with various chemical reagents. However, the asymmetric functionalization of carbon nanotubes with each of their two end-tips attached by different chemical reagents remains a challenge. The asymmetric end-functionalization, if realized, should significantly advance the self-assembling of carbon nanotubes into many new functional structures with a molecular-level control.

Therefore, there is a need for asymmetric functionalized carbon nanotubes, and for methods of preparing them.

SUMMARY OF THE INVENTION

The present invention meets those needs by providing a method of making an asymmetric end-functionalized carbon nanotube film. The method comprises: providing a carbon nanotube film having a first end and a second end; contacting the first end of the carbon nanotube film with a first reactive medium; reacting the first end of the carbon nanotube film with the first reactive medium by a first physicochemical process; contacting the second end of the carbon nanotube film with a second reactive medium, wherein the first reactive medium is different from the second reactive medium; and reacting the second end of the carbon nanotube film with the second reactive medium by a second physicochemical process.

DETAILED DESCRIPTION OF THE INVENTION

We prepared large-scale, perpendicularly-aligned multi-wall carbon nanotubes (MWNTs) by pyrolyzing iron (II) phthalocyanine (FePc) onto a clean quartz glass plate in a tube furnace at 800-1100° C. under a mixture gas flow of Ar and $H_2$. We also developed several microfabrication methods for patterning the aligned carbon nanotubes and for patterned/non-patterned transferring such nanotube arrays to various other substrates or as a free-standing film. We found that the as-synthesized aligned carbon nanotube film could be easily separated from the quartz glass as a clean substrate-free film by immersing the nanotube-deposited quartz plate into an aqueous hydrofluoric acid solution (about 10% w/w), followed by thoroughly washing with pure water. The substrate-free aligned carbon nanotube film thus prepared can float either on a hydrophilic solvent (e.g., water, alcohol) due to its hydrophobic nature or on a high-density solvent (e.g. 1,1,2,2-tetrachloroethane, TCE, $\rho$=1.58 g/ml) because of the density difference. In both cases, each of the constituent carbon nanotubes within the aligned nanotube film is perpendicularly aligned at the air/liquid interface.

This led to the development of a novel photochemical approach for asymmetric end-functionalization of carbon nanotubes by sequentially floating the substrate-free aligned carbon nanotube film on two different photoreactive solutions with only one side of the nanotube film being contacted with a photoreactive solution and exposed to UV light each time. While the contact between the hydrophobic nanotube sidewall and photoreactive solution via capillary effect is minimal, the photochemical approach allows only the nanotube tips to be modified by UV-irradiating the nanotube film at a normal incidence angle.

One of the first and second reactive solution can contain hydrophobic reactant(s) and the other hydrophilic reactant(s), both can contain hydrophobic reactants, or both can contain hydrophilic reactants, if desired. The order of the reactions does not matter.

Figure 1:
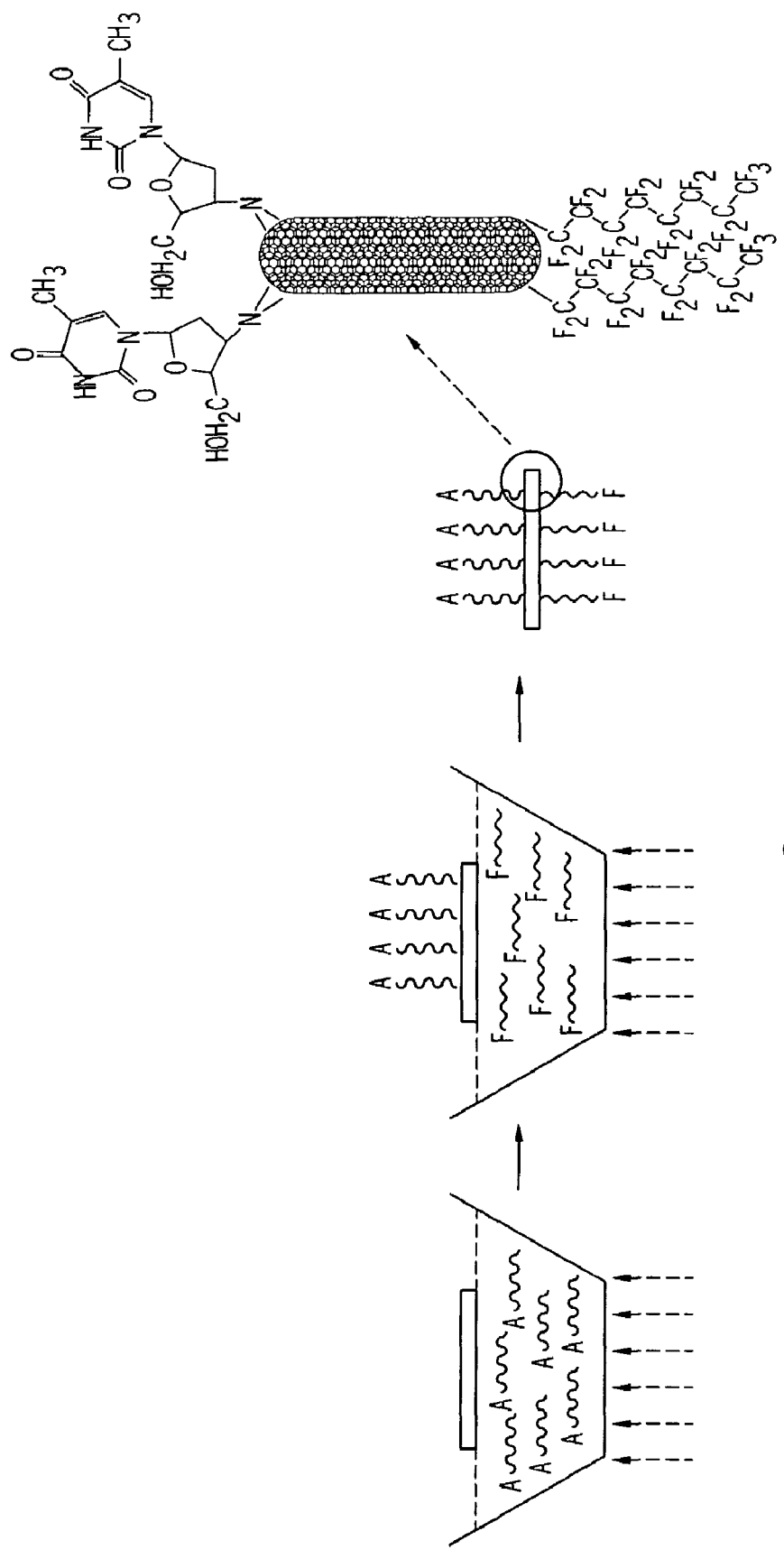
FIG. 1 is a schematic showing the asymmetric end-functionalization reactions of the present invention.

FIG. 1 is a representation of a procedure for the asymmetric end-functionalization of a carbon nanotube film.

The carbon nanotube film is generally an aligned carbon nanotube film. The carbon nanotube film is contacted with a first reactive medium. The reactive medium is one which contains a compound which will react to the particular physicochemical process being used. For example, if a photochemical process is being used, a photoreactive solution will be used. If a plasma process is used, the reactive medium will be appropriate monomer vapor(s).

The physicochemical process is then performed with the first medium by exposing the medium and carbon nanotubes to the physicochemical activation source for the particular type of reaction. The reaction occurs between one end of the carbon nanotubes and the medium. The particular physicochemical activation source used will depend on the process being used. For example, in a photochemical reaction, the activation source will be a source of radiation, such as ultraviolet light, infrared light, or visible light. The photochemical reaction will then take place between the photoreactive solution and the carbon nanotubes.

The other side of the carbon nanotube film is contacted with a second reactive medium, and the medium is exposed to the activation source for that type of reaction. The first and second reactive media are different.

The physicochemical process can be same for both reactions, or they can be different. If the same process is used for both reactions, the activation sources can be the same or they can be different. For example, with photochemical reactions, ultraviolet radiation can be used for both, or ultraviolet radiation can be used for one, and another radiation source can be used for the other.

Suitable physicochemical processes include, but are not limited to photochemical reactions, plasma activated reactions, adsorption, deposition, coating, ion beam etching, thermal/chemical oxidation, and chemical grafting.

This allows the appropriate selection of physicochemical process and reactive medium depending on the particular chemicals which are to be added to each end of the carbon nanotubes.

EXAMPLE 1

The end-attachment of 3'-Azido-3'-deoxythymidine (AZT) molecules was carried out by UV-irradiating (100 W Hanovia 7825 medium pressure mercury lamp at a lamp-sample distance of 10 cm for 1 hr), through the bottom of the quartz-boat container at a normal incidence angle, with one side of the aligned carbon nanotube film floating on an AZT solution in ethanol. The end-functionalized aligned carbon nanotube film thus-prepared (designated as: A-CNT) was then removed from the AZT solution with care and thoroughly washed with pure ethanol to remove physically-absorbed AZT molecules, if any. Thereafter, the freshly purified, aligned A-CNT film was laid on the top surface of a perfluorooctyl iodide solution in TCE (2 wt %) with the unmodified side of the aligned carbon nanotube film in contact with the TCE solution for the end-attachment of perfluorooctyl chains (F-CNT) by UV-irradiation in the same manner as in the case for the AZT attachment. The resultant asymmetrically-modified aligned carbon nanotube film (designated as: A-CNT-F) was then washed by repeatedly rinsing with pure ethanol to completely remove any absorbed perfluorooctyl iodide molecules and dried in an ambient atmosphere for subsequent characterization.

Figure 2:
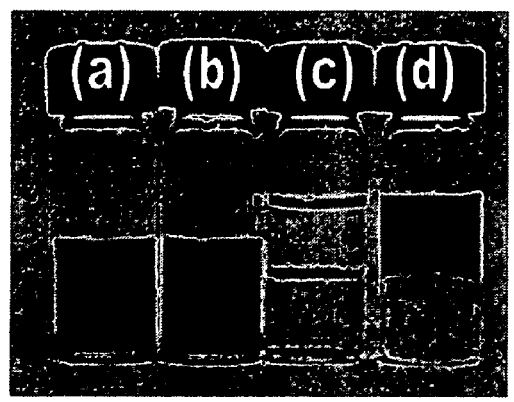
FIG. 2 shows dispersions of (a) A-CNTs in $H_2O$/ethanol (9/1 v/v), (b) F-CNTs in TCE/ethanol (9/1 v/v), and (c) A-CNT-F in a mixture solvent of $H_2O$/ethanol (9/1 v/v, top)+TCE/ethanol (9/1 v/v, bottom).

Next, we demonstrated the potential for self-assembling of the modified carbon nanotubes through the hydrophilic/hydrophobic interactions. We used ultrasonication (Electron Microscopy Science-2510MT) to deliberately destroy the alignment of the A-CNT, F-CNT, and A-CNT-F films and to disperse them homogeneously in $H_2O$/ethanol (9/1 v/v, FIG. 2a), TCE/ethanol (9/1 v/v, FIG. 2b), and a mixture solvent of $H_2O$/ethanol (9/1 v/v)+TCE/ethanol (9/1 v/v) (FIG. 2c), respectively. As shown in FIG. 2a, a stable homogenous dispersion in the hydrophilic solvent of $H_2O$/ethanol (9/1 v/v) was obtained (no precipitation about 2 days after the sonication) for the carbon nanotubes end-functionalized with the hydrophilic AZT molecules. Similarly, the hydrophobically-modified F-CNTs in the hydrophobic solvent of TCE/ethanol (9/1 v/v) gave a stable homogenous dispersion (no precipitation about 4 days after the sonication) (FIG. 2b). In contrast, a sonication-induced homogenous dispersion of the asymmetrically-modified A-CNT-F nanotubes in the mixture solvent of $H_2O$/ethanol (9/1 v/v)+TCE/ethanol (9/1 v/v) rapidly segregated (about 5 min after the sonication) into a two-phase system, where the hydrophilic solvent of $H_2O$/ethanol (9/1 v/v, top in FIG. 2c) equilibrated immiscibly with the hydrophobic solvent of TCE/ethanol (9/1 v/v, bottom in FIG. 2c), with the A-CNT-F nanotubes self-assembling at the interface. This observation is consistant with the asymmetric end-functionalization reactions schematically shown in FIG. 1, indicating a possible control of the dispersion stability and self-assembling process by regulating the nature and size of the chemical moieties attached onto the nanotube tips.

Figure 3A:
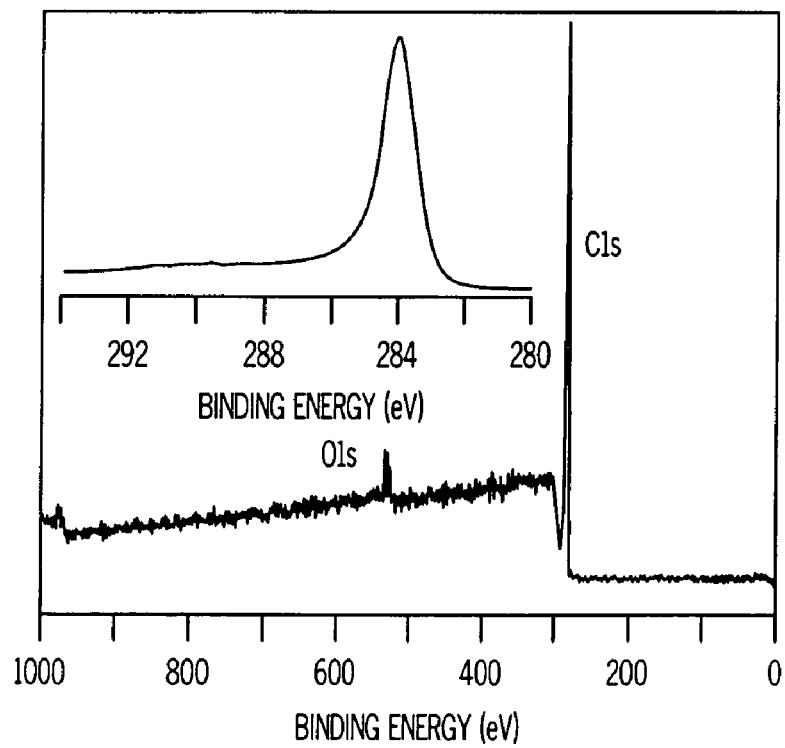
FIG. 3 shows the XPS spectra of (a) the pristine aligned carbon nanotube film, (b) the AZT-grafted side, and (c) the perfluorooctyl chain-grafted side (c) of an aligned carbon nanotube film after the asymmetric end-functionalization. Insets show the corresponding high-resolution C 1 s spectra.
Figure 3B:
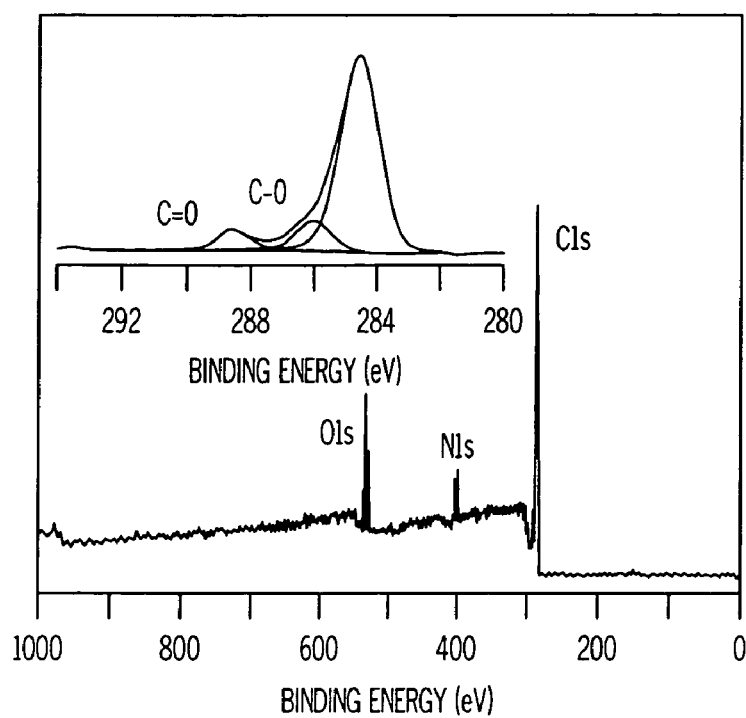
Figure 3C:
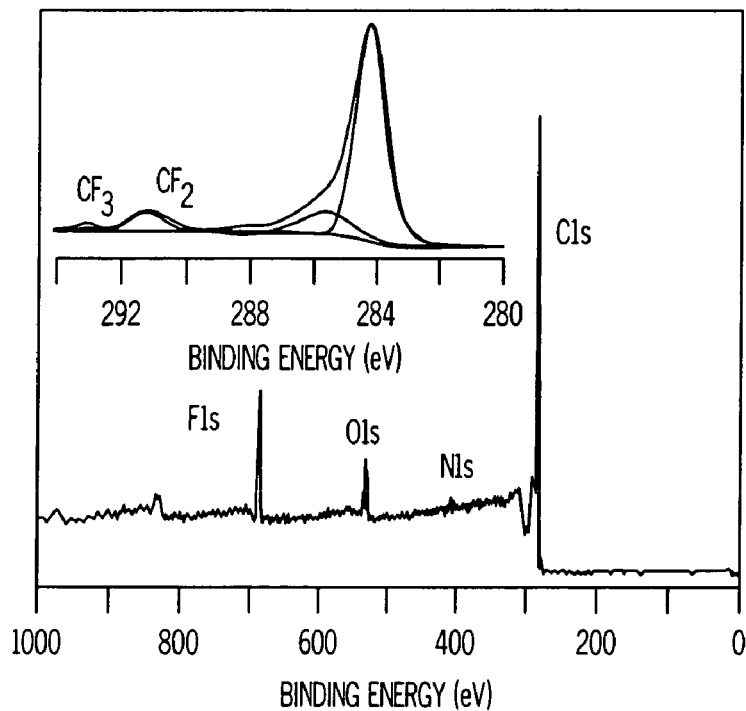

We also performed X-ray photoelectron spectroscopic (XPS, VG Microtech ESCA 2000 using monochromatic Mg Ka radiation at a power of 300 W) measurements on an aligned carbon nanotube film before and after the asymmetric end-functionalization for a more quantitative characterization. FIG. 3 shows the survey spectra for (a) the pristine aligned carbon nanotube film, (b) the AZT-grafted side (A-side) and (c) perfluorooctyl chain-grafted side (F-side) of an aligned A-CNT-F film, along with the corresponding high resolution C 1 s spectra (insets). FIG. 3a shows the expected graphitic C 1 s peak at 284.7 eV and a weak signal for O 1 s (531 eV), consistent with previously reported results. Although not wishing to be bound by theory, the atomic ratio of O/C=0.038 deduced from the survey spectrum in FIG. 3a could be attributed to possible incorporation of a trace amount of oxygen during the nanotube growth and/or through the post-synthesis adsorption. The C 1 s spectrum shown in the inset of FIG. 3a is similar to that of HOPG graphite. The XPS survey spectrum for the A-side of the aligned A-CNT-F film (FIG. 3b) shows a N 1 s peak at 399 eV with a concomitant increase in the atomic ratio of O/C from 0.038 to 0.15 due to the attachment of AZT molecules. The appearance of new peaks at about 286.5 and 288.6 eV in the corresponding high-resolution C 1 s spectrum given in the inset of FIG. 3b are attributable to the C—O and C=O bonds, respectively, associated with the AZT moieties. On the other hand, XPS measurements on the F-side of the aligned A-CNT-F film revealed a new peak at 685 eV attributable to F 1 s with its Auger features appeared around 850 eV (FIG. 3c). Apart from the graphitic C 1 s peak at 284.7 eV, the corresponding high-resolution C 1 s spectrum (inset, FIG. 3c) shows the $CF_2$ peak at 291 eV and a carbon component around 285.6 eV attributable to (nanotube) carbon atoms adjacent to the C—F bonds.

The XPS results indicate that both 3'-Azido-3'-deoxythymidine and perfluorooctyl moieties have been successfully bonded onto the opposite tube-ends of individual carbon nanotubes within the aligned nanotube film. A trivial explanation of the XPS results related to physical adsorption of the photoreactive reagents can be ruled out as no obvious change was observed for XPS spectra recorded from the aligned carbon nanotube film after the same treatments but without the UV exposure. The photochemically-grafted end-groups can be used for further chemical modification via their characteristic reactions, indicating a generic nature of the asymmetric end-functionalization approach developed in the present study for asymmetric chemical modification of carbon nanotubes.

In summary, we have successfully developed a simple but effective method for grafting different chemical reagents onto the opposite tube-ends of individual carbon nanotubes, as confirmed by X-ray photoelectron spectroscopic measurements. It was also demonstrated that the asymmetrically-modified carbon nanotubes with the hydrophilic 3'-Azido-3'-deoxythymidine molecules chemically attached onto one tube-end and the hydrophobic perfluorooctyl moieties on the other could effectively self-assemble at the hydrophilic/hydrophobic interface in a two-phase solvent system.

Depending on what and how to activate each of the two nanotube ends, the number of chemical reagents that can be asymmetrically attached onto the nanotube ends is unlimited. In particular, plasma activation can be used to graft each of the two nanotube ends with various functional groups (e.g. —COOH, —COH, —OH, —$NH_2$, etc.), followed by further chemical modification through reactions characteristic of the plasma-induced functionalities as discussed in Q. Chen, L.

Dai, M. Gao, S. Huang, and A. W. H. Mau "Plasma activation of carbon nanotubes for chemical modification" *J. Phys. Chem. B* 105, 618, 2001), which is incorporated herein by reference.

Asymmetric end-functionalization of carbon nanotubes was achieved by sequentially floating a substrate-free aligned carbon nanotube film on two different photoreactive solutions with only one side of the nanotube film being contacted with the photoreactive solution and exposed to UV light each time. The resultant nanotubes with different chemical reagents attached onto their opposite tube-ends should be very useful for site-selective self-assembling of carbon nanotubes into many novel functional structures for various potential applications.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A method of making an asymmetric end-functionalized carbon nanotube film, comprising:
    providing a carbon nanotube film substrate free having a first end and a second end;
    contacting the first end of the carbon nanotube film with a first reactive medium;
    reacting the first end of the carbon nanotube film with the first reactive medium by a first physicochemical process to form an end-functionalized first end without reacting the sidewall or the second end;
    contacting the second end of the carbon nanotube film with a second reactive medium, wherein the first reactive medium is different from the second reactive medium; and
    reacting the second end of the carbon nanotube film with the second reactive medium by a second physicochemical process to form an end-functionalized second end without reacting the sidewall or the first end; wherein the end-functionalized first end is different from the end-functionalized second end.

2. The method of claim 1 wherein contacting the first end of the carbon nanotube film with the first reactive medium comprises floating the carbon nanotube film on a first reactive solution or wherein contacting the second end of the carbon nanotube film with the second reactive medium comprises floating the carbon nanotube film on a second reactive solution.

3. The method of claim 1 wherein the first or second physicochemical process is selected from photochemical processes, plasma processes, adsorption processes, deposition processes, coating processes, ion beam etching processes, thermal/chemical oxidation processes, and chemical grafting processes.

4. The method of claim 1 wherein the first physicochemical process is a photochemical process and wherein reacting the first end of the carbon nanotube film with the first reactive medium comprises exposing the first end of the carbon nanotube film to a source of radiation selected from ultraviolet radiation, infrared radiation, or visible light or wherein the second physicochemical process is a photochemical process and wherein reacting the second end of the carbon nanotube film with the second reactive medium comprises exposing the second end of the carbon nanotube film to a source of radiation selected from ultraviolet radiation, infrared radiation, or visible light.

5. The method of claim 4 wherein the source of radiation is perpendicular to the carbon nanotube film.

6. The method of claim 4 wherein the first reactive medium is a solution containing 3'-azido-3'-deoxythymidine and the second reactive medium is a solution containing perfluorooctyl iodide.

7. The method of claim 1 wherein the first reactive medium contains a hydrophilic reactant and the second reactive medium contains a hydrophobic reactant.

8. The method of claim 1 wherein the carbon nanotube film comprises carbon nanotubes selected from single-wall carbon nanotubes or multi-wall carbon nanotubes.

9. The method of claim 1 wherein the carbon nanotube film is aligned.

10. The method of claim 1 wherein the first and second physicochemical processes are the same.

11. The method of claim 1 wherein the carbon nanotube film is a perpendicularly aligned carbon nanotube film.

12. The method of claim 1 wherein providing a substrate-free carbon nanotube film comprises:
    synthesizing a carbon nanotube film on a quartz substrate;
    immersing the synthesized carbon nanotube film on the quartz substrate in hydrofluoric acid; and
    separating the carbon nanotube film from the quartz substrate.

13. A method of making an asymmetric end-functionalized carbon nanotube film, comprising:
    providing a carbon nanotube film substrate free having a first end and a second end;
    floating the first end of the aligned carbon nanotube film on a first photoreactive solution;
    exposing the first end of the aligned carbon nanotube film to ultraviolet radiation so that the first end of the aligned carbon nanotube film reacts with the first photoreactive solution;
    floating the second end of the aligned carbon nanotube film on a second photoreactive solution, wherein the first photoreactive solution is different from the second photoreactive solution; and
    exposing the second end of the aligned carbon nanotube film to ultraviolet radiation so that the second end of the aligned carbon nanotube film reacts with the second photoreactive solution.

14. The method of claim 13 wherein the ultraviolet radiation is perpendicular to the aligned carbon nanotube film.

15. The method of claim 13 wherein the first photoreactive solution contains a hydrophilic reactant and the second photoreactive solution contains a hydrophobic reactant.

16. The method of claim 13 wherein the first photoreactive solution contains 3'-azido-3'-deoxythymidine and the second photoreactive solution contains perfluorooctyl iodide.

17. The method of claim 13 wherein the carbon nanotube film comprises carbon nanotubes selected from single-wall carbon nanotubes or multi-wall carbon nanotubes.

18. The method of claim 13 wherein the carbon nanotube film is aligned.

19. The method of claim 13 wherein the first and second physicochemical processes are the same.

20. The method of claim 13 wherein the carbon nanotube film is a perpendicularly aligned carbon nanotube film.

21. The method of claim 13 wherein providing a substrate-free carbon nanotube film comprises:
    synthesizing a carbon nanotube film on a quartz substrate;
    immersing the synthesized carbon nanotube film on the quartz substrate in hydrofluoric acid; and
    separating the carbon nanotube film from the quartz substrate.

* * * * *